(No Model.)

J. C. KITTON.
ICE MACHINE.

No. 424,005. Patented Mar. 25, 1890.

Witnesses:
Inventor,
John C. Kitton
By Dewey & Co.
Attys

UNITED STATES PATENT OFFICE.

JOHN C. KITTON, OF SAN FRANCISCO, CALIFORNIA, ASSIGNOR OF ONE-HALF TO WILLIAM T. GARRATT & CO., OF SAME PLACE.

ICE-MACHINE.

SPECIFICATION forming part of Letters Patent No. 424,005, dated March 25, 1890.

Application filed October 2, 1889. Serial No. 325,761. (No model.)

*To all whom it may concern:*

Be it known that I, JOHN C. KITTON, a citizen of the United States, residing in the city and county of San Francisco, State of California, have invented an Improvement in Ice-Machines; and I hereby declare the following to be a full, clear, and exact description of the same.

My invention relates to certain improvements in ice-machines.

It consists of a series of vertically-disposed freezing-channels within a tank having inclosing-chambers within which the freezing medium is circulated around these freezing-spaces, and in combination therewith of a series of vertically-arranged transverse sliding boxes or hollow removable partitions, which are dropped into the aforesaid channels to provide end spaces, through which the freezing medium is circulated, so that refrigeration is carried on at points intermediate in the length of the chambers as well as at the sides.

Figure 1:
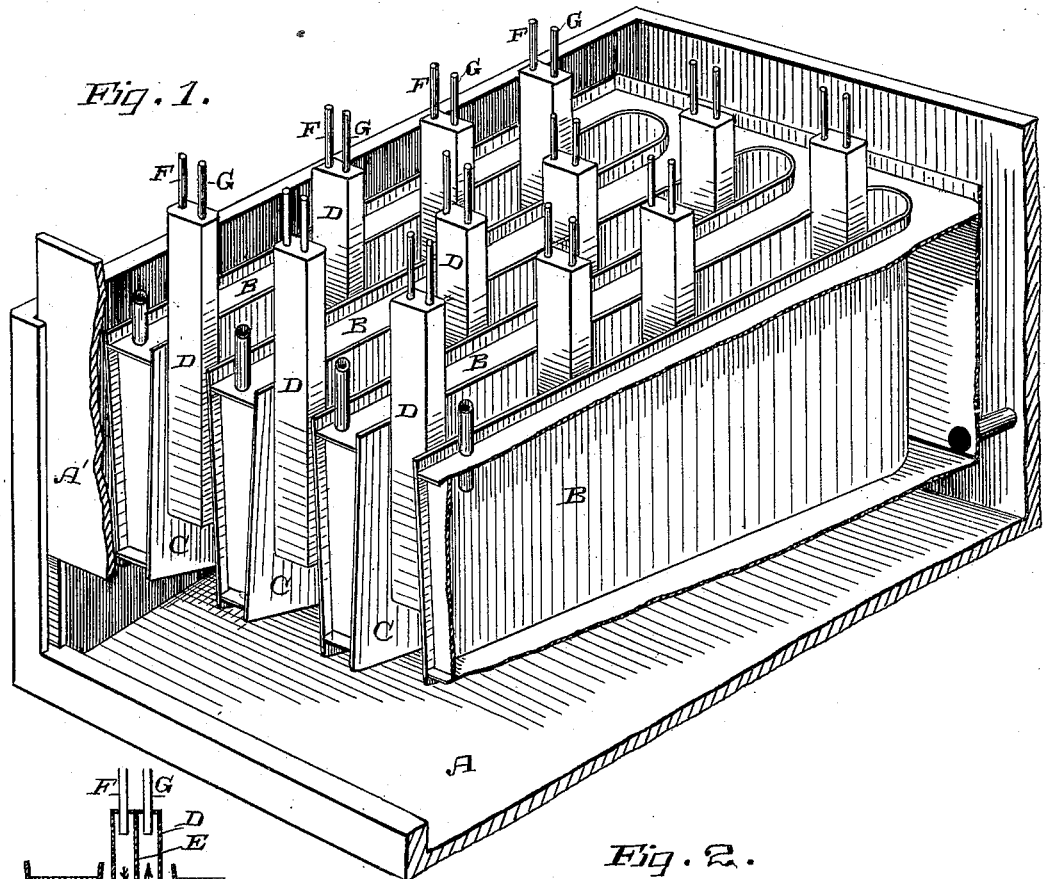
Figure 3:
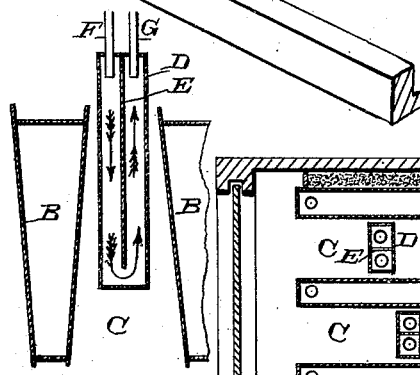
Figure 2:
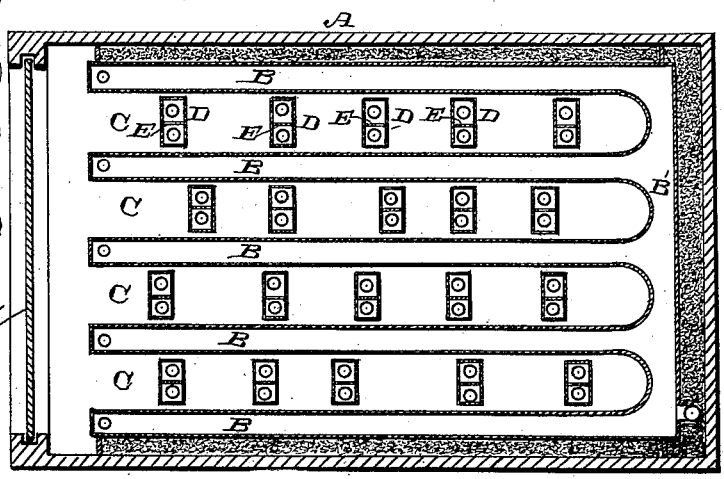

Referring to the accompanying drawings for a more complete explanation of my invention, Figure 1 is a perspective view of an ice-machine, showing the application of my invention. Fig. 2 is a plan view. Fig. 3 is a transverse section showing a freezing-chamber and one of the removable partitions.

A is the exterior tank, which may be made of wood or of other suitable material, and of a size sufficient to contain the desired number of freezing-chambers and the necessary amount of freezing medium and fresh water. A series of metal chambers B are placed within this exterior tank, these chambers being so arranged as to inclose the vertical channels C, which extend from end to end and from top to bottom, having one end open, while the other end of each channel is closed by a transverse end chamber, which unites that end of all the chambers B. The freezing medium is admitted into the chambers B at or near the separated ends, so that this medium will flow from these independent ends toward the ends which are united by the transverse connecting-chamber above described, and from this chamber the freezing medium is withdrawn by means of a pump in the usual manner, a single pipe or connection sufficing for the purpose. The end of the tank corresponding with the separated ends of the chambers B and the open ends of the intermediate freezing-chambers is provided with a vertically-sliding gate, which is closed and suitably packed to make a tight joint when the operation of freezing is to take place.

The tank A being filled with water, which fills all the spaces or channels between the chambers containing the freezing medium, I then lower into these channels a series of hollow rectangular partition-boxes D, which extend nearly or quite to the bottom of these channels transversely and may be arranged at any desired distance apart, so as to subdivide the channels into sections of any desired length. Vertical diaphragms E extend from the top of these hollow partition-boxes to a point near the bottom, and the upper ends of the passages thus formed are connected, respectively, with the inlet-pipe F and the outlet-pipe G. These pipes convey the brine or freezing medium which is used, and it passes down through the passage upon one side of the partition and up on the opposite side into the pipe through which it is led away in the usual manner. By this construction I not only supply the brine or freezing medium upon each side of these water-containing channels, but also admit it into these intermediate partitions, which thus form a series of vertical division-chambers, through each of which the freezing medium passes, and the process is considerably hastened and augmented. When the water in these channels has become sufficiently frozen, the freezing compound is withdrawn from the vertical partitions and warm water is introduced through them and their connecting-pipes until they become loosened, so that they may be lifted out, leaving the blocks of ice in the channels separated from each other. These blocks may then be loosened from the sides by a similar withdrawal of the freezing medium from the channels B and the admission of warm water into these chambers, after which the blocks settle upon the inclined bottom of the tank and will slide forward, so that when the gate is opened the ice may be removed in blocks of suitable or convenient size for handling. It will be manifest that these supplemental removable transverse freezing chambers or partitions may be employed in connection with other forms of what are known as "can" or "plate" machines, the object being to apply the freezing medium at the ends as well as the sides of the water-containing chambers, and also at a number of intermediate points in the length of the chambers to increase the freezing capacity.

Having thus described my invention, what I claim as new, and desire to secure by Letters Patent, is—

1. In an ice-machine, the molds and the inclosing-chambers through which the refrigerating-liquid is circulated, in combination with the hollow vertical division-chambers and pipes by which the refrigerating-liquid is supplied to them, substantially as herein described.

2. In an ice-machine, the molds and the surrounding chambers within which the refrigerating-liquid is circulated, in combination with the vertical dividing-chambers fitting loosely into the molds and having diaphragms or partitions by which vertical passages are formed, together with the supply and discharge pipes connected with the upper ends of these passages respectively, substantially as and for the purpose herein described.

3. An ice-machine consisting of a series of parallel chambers within which a freezing compound is circulated and intermediate water-containing channels, in combination with a series of independent loosely-fitting hollow chambered partitions extending from top to bottom and transversely within the water-channels, and supply and discharge pipes connected with the chambers of the partitions, substantially as herein described.

In witness whereof I have hereunto set my hand.

JOHN C. KITTON.

Witnesses:
S. H. NOURSE,
H. C. LEE.